United States Patent
Tajima et al.

(10) Patent No.: US 10,955,813 B2
(45) Date of Patent: Mar. 23, 2021

(54) CONTROL APPARATUS FOR TAPPING

(71) Applicant: Fanuc Corporation, Yamanashi (JP)

(72) Inventors: Daisuke Tajima, Yamanashi (JP);
Yuuki Morita, Yamanashi (JP);
Tadashi Okita, Yamanashi (JP)

(73) Assignee: Fanuc Corporation, Yamanashi (JP)

(*) Notice: Subject to any disclaimer, the term of this patent is extended or adjusted under 35 U.S.C. 154(b) by 110 days.

(21) Appl. No.: 16/278,931

(22) Filed: Feb. 19, 2019

(65) Prior Publication Data

US 2019/0258217 A1    Aug. 22, 2019

(30) Foreign Application Priority Data

Feb. 20, 2018   (JP) .............................. JP2018-027732

(51) Int. Cl.
   *G05B 19/19*   (2006.01)

(52) U.S. Cl.
   CPC .... *G05B 19/19* (2013.01); *G05B 2219/49108* (2013.01)

(58) Field of Classification Search
   CPC ................ G02B 19/169; G02B 2219/49108
   See application file for complete search history.

(56) References Cited

U.S. PATENT DOCUMENTS

| | | | | |
|---|---|---|---|---|
| 5,910,199 | A * | 6/1999 | Busick | B23G 1/04 82/1.11 |
| 6,008,609 | A * | 12/1999 | Sawashima | G05B 19/186 318/570 |
| 10,065,255 | B2 | 9/2018 | Morita et al. | |
| 2016/0357171 | A1* | 12/2016 | Morita | G05B 19/4141 |

FOREIGN PATENT DOCUMENTS

| | | |
|---|---|---|
| CN | 103894685 A | 7/2014 |
| CN | 103894685 B * | 8/2016 |
| JP | 3712994 B | 9/1962 |
| JP | 04-093114 A | 3/1992 |
| JP | 04362710 A | 12/1992 |
| JP | 2016078223 A | 5/2016 |
| JP | 2017030061 A | 2/2017 |

* cited by examiner

*Primary Examiner* — Robert A Cassity
(74) *Attorney, Agent, or Firm* — RatnerPrestia

(57) ABSTRACT

A control apparatus of a machine tool, the control apparatus including: a numerical control unit configured to create a spindle axis command and a feed axis command according to a tapping program; a spindle axis control unit configured to control rotational operation of the spindle axis according to the spindle axis command; a rotation detector configured to detect a rotation position of the spindle axis; and a feed axis control unit configured to control feeding operation of the feed axis according to the feed axis command on the basis of the rotation position. The numerical control unit is further configured to include, in the spindle axis command, a speed command value during return that does not depend on maximum rotation speed during machining of the spindle axis and that is higher than the maximum rotation speed during machining, as a command of return operation.

4 Claims, 9 Drawing Sheets

CONTROL APPARATUS FOR TAPPING

CROSS-REFERENCE TO RELATED APPLICATIONS

This application is a new U.S. Patent Application that claims benefit of Japanese Patent Application No. 2018-027732, filed Feb. 20, 2018, the disclosure of this application is being incorporated herein by reference in its entirety for all purposes.

BACKGROUND OF THE INVENTION

1. Field of the Invention

The present invention relates to a control apparatus of a machine tool that performs tapping with synchronized operation of a spindle axis and a feed axis.

2. Description of the Related Art

A machine tool performing tapping with synchronized operation of a spindle axis and a feed axis is required to reduce cycle time while maintaining machining accuracy. For example, JP 04-093114 A describes the following: "For example, this tapping is performed to a predetermined depth in Z-axis at a rotation speed of 2000 rpm of a spindle axis. After a female screw is cut, the spindle axis is rotated inversely at a rotation speed acquired by multiplying 2000 rpm by a ratio of tap return, for example, at 4000 rpm when the ratio is 200%".

SUMMARY OF THE INVENTION

In a machine tool that performs tapping, the rotation speed of a spindle axis during machining is typically set at a relatively low value in consideration of a load to be applied to a tapping tool. It is desired to reduce cycle time throughout the tapping, even when the rotation speed of a spindle axis during machining is set at a relatively low value in consideration of a load to be applied to a tapping tool.

An aspect of the present disclosure is a control apparatus configured to control synchronized operation of a spindle axis and a feed axis of a machine tool, and that includes a numerical control unit configured to create a spindle axis command and a feed axis command according to a tapping program, a spindle axis control unit configured to control rotational operation of the spindle axis according to the spindle axis command, a rotation detector configured to detect a rotation position of the spindle axis, and a feed axis control unit configured to control feeding operation of the feed axis according to the feed axis command on a basis of the rotation position, the numerical control unit further configured to include, in the spindle axis command, a speed command value during return that does not depend on maximum rotation speed during machining of the spindle axis and that is higher than the maximum rotation speed during machining, as a command of return operation for returning to a machining start position from a target screw depth.

BRIEF DESCRIPTION OF THE DRAWINGS

The objects, features and advantages of the invention will become more apparent from the following description of the embodiments in connection with the accompanying drawings, wherein.

DETAILED DESCRIPTION

Figure 1:
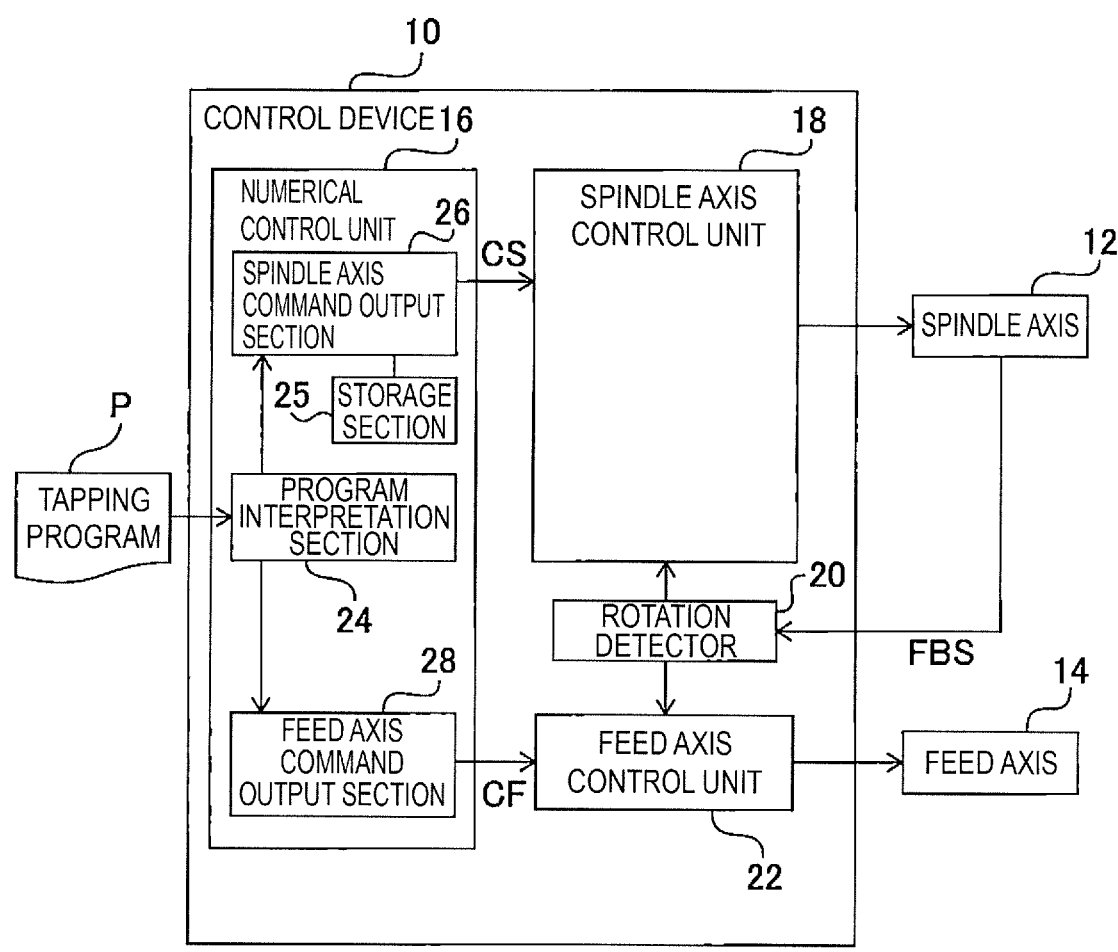
FIG. 1 is a function block diagram illustrating a configuration of a control apparatus of a machine tool, according to a first embodiment.

Embodiments of the present invention will be described below with reference to the accompanying drawings. Throughout the drawings, corresponding components are denoted by common reference numerals. For easy understanding, scales of the drawings are appropriately changed. Note that modes illustrated in the drawings are merely examples to implement the invention, and the invention is not limited to the modes illustrated.

First Embodiment

FIG. 1 is a function block diagram illustrating a configuration of a control apparatus 10 of a machine tool, according to a first embodiment. In a machine tool (e.g., a lathe, a drilling machine, a machining center, etc.) that performs tapping with synchronized operation of a spindle axis 12 and a feed axis 14, the control apparatus 10 controls the synchronized operation in which the feed axis 14 operates so as to follow rotational operation of the spindle axis 12, in consideration of a screw pitch designated according to a tapping program P. The spindle axis 12 (not illustrated) is a control axis provided in a drive device such as a servo motor that rotationally moves, at a speed necessary for machining, a holder for holding a workpiece or a tool. The feed axis 14 (not illustrated) is a control axis provided in a drive device such as a servo motor that causes a support part for supporting a workpiece or a tool to perform feed motion at a speed necessary for machining. For example, a lathe enables the feed axis 14 to linearly feed a tool to a workpiece being rotated by the spindle axis 12, or to linearly feed a workpiece being rotated by the spindle axis 12 to a tool. A drilling machine enables the feed axis 14 to linearly feed a tool being rotated by the spindle axis 12 to a workpiece, or to linearly feed a workpiece to a tool being rotated by the spindle axis 12. Each of the machines above allows the feed axis 14 having a relatively large margin for acceleration and deceleration torque during operation to operate so as to follow the spindle axis 12 having a relatively small margin for the acceleration and deceleration torque during operation, so that a synchronization error can be reduced and machining accuracy can be improved. In the present embodiment and each embodiment described below, a configuration of a machine tool is not particularly limited.

The control apparatus 10 includes a numerical control unit 16 that creates a spindle axis command CS and a feed axis command CF according to the tapping program P, a spindle axis control unit 18 that controls the rotational operation of the spindle axis 12 according to the spindle axis command CS, a rotation detector 20 that detects a rotation position of the spindle axis 12, and a feed axis control unit 22 that controls feeding operation of the feed axis 14 according to the feed axis command CF on the basis of the rotation position detected by the rotation detector 20. The numerical control unit 16 includes a program interpretation section 24 that interprets the tapping program P, a spindle axis command output section 26 that creates the spindle axis command CS according to an interpretation of the program interpretation section 24 and transmits the spindle axis command CS to the spindle axis control unit 18, and a feed axis command output section 28 that creates the feed axis command CF according to an interpretation of the program interpretation section 24 and transmits the feed axis command CF to the feed axis control unit 22. The numerical control unit 16 may have a hardware configuration of a CNC apparatus known in the art. The above description of a basic configuration of the control apparatus 10 can be similarly applied to another embodiment described below.

As described in detail below, the control apparatus 10 according to the first embodiment is configured to control, during return from tapping, the spindle axis by setting, as a target speed, an allowable maximum rotation speed of the spindle axis motor with no-load that does not depend on the speed command of the spindle axis during machining designated according to the tapping program.

The numerical control unit 10 interprets the tapping program P and acquires a maximum rotation speed during machining V0 of the spindle axis 12 in a period from a machining start position (rotation position) to a target screw depth (rotation position). The numerical control unit 10 instructs the spindle axis control unit 18 about the maximum rotation speed during machining V0 as a target speed during machining. At this time, the numerical control unit 10 may acquire, from tapping operation conditions (a screw pitch, a screw depth, etc.) included in the tapping program P, a total amount of rotation S0 of the spindle axis to reach the target screw depth from the machining start position and may include the total amount of rotation S0 in the spindle axis command CS to the spindle axis control unit 18. For example, when the tapping program P includes a command of machining a female screw with a screw pitch of 1.25 mm and a screw depth of 30 mm at the maximum rotation speed during machining V0 of 3000/min of the spindle axis 12, the total amount of rotation S0 of the spindle axis 12 in a period from the machining start position to the target screw depth is as follows: 30/1.25=24 (rev). Then, the spindle axis command output section 26 includes V0=3000 (min$^{-1}$) and S0=24 (rev) in the spindle axis command CS.

The spindle axis control unit 18 controls the rotational operation of the spindle axis 12 with general feedback control using a rotation position (a feedback value, hereinafter referred to as "rotation position FBS") of the spindle axis 12 detected by the rotation detector 20. The feed axis control unit 22 controls the feeding operation of the feed axis 14, following the operation of the spindle axis 12, with feedback control using not only a feedback value of a feed position of the feed axis 14, but also the rotation position FBS of the spindle axis 12. Note that the rotation detector 20 can acquire the rotation position FBS from an output of a position detector (not illustrated), such as an encoder, for detecting an operation position of a drive device of the spindle axis 12.

As illustrated in FIG. 1, the numerical control unit 16 includes a storage section 25. The storage section 25 stores a maximum rotation speed during return Vr of the spindle axis that is the allowable maximum rotation speed of the spindle axis motor with no-load. The numerical control unit 16 instructs the spindle axis control unit 18 about the maximum rotation speed during return Vr as a target speed of the spindle axis at the time of return operation of drawing out a tool from the target screw depth. It should be noted that the maximum rotation speed during return Vr instructed is the allowable maximum rotation speed of the spindle axis motor with no-load that does not depend on the speed command of the spindle axis during machining operation (during cutting operation).

Figure 2:
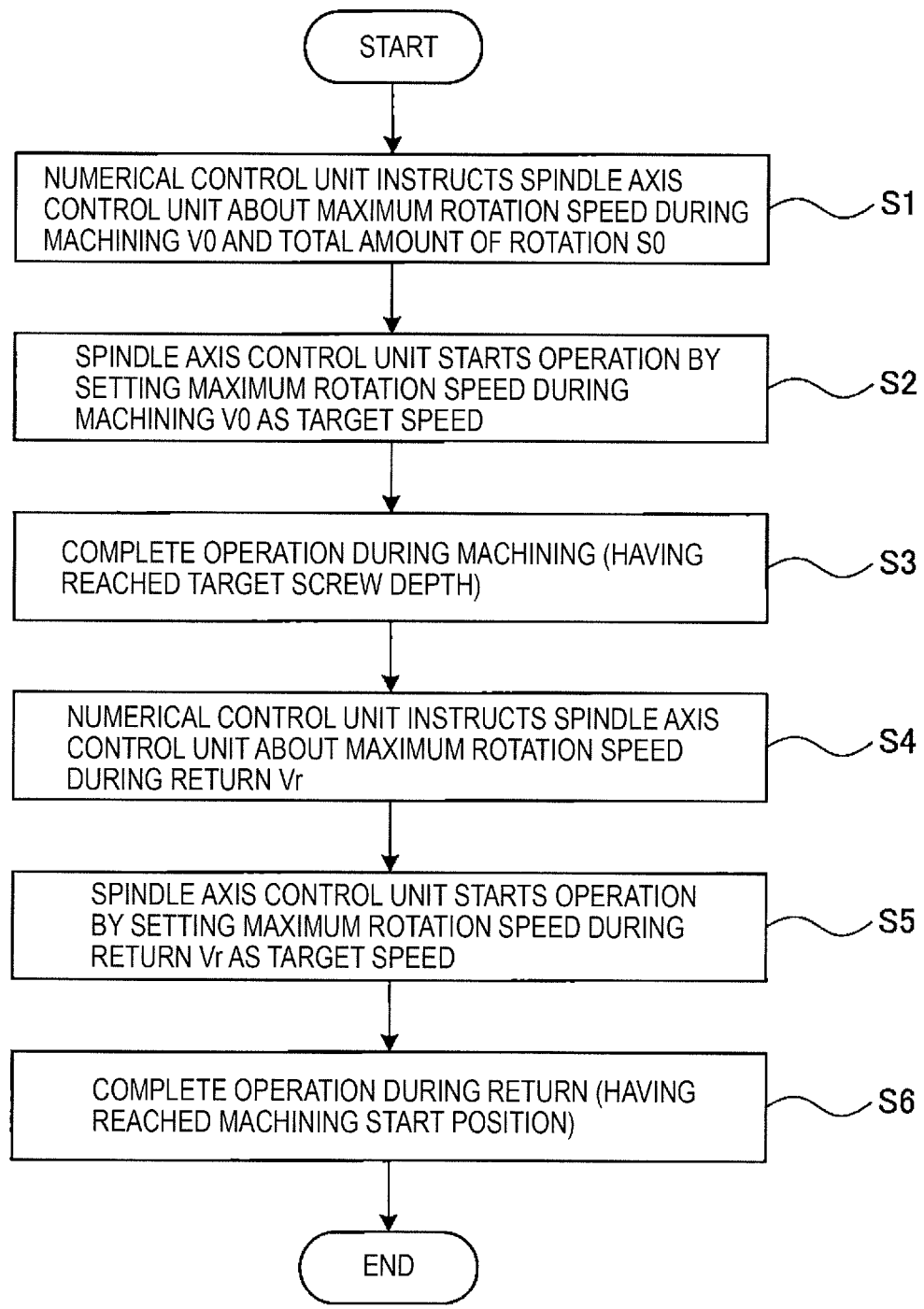
FIG. 2 is a flowchart illustrating tapping control operation according to the first embodiment.
Figure 3:
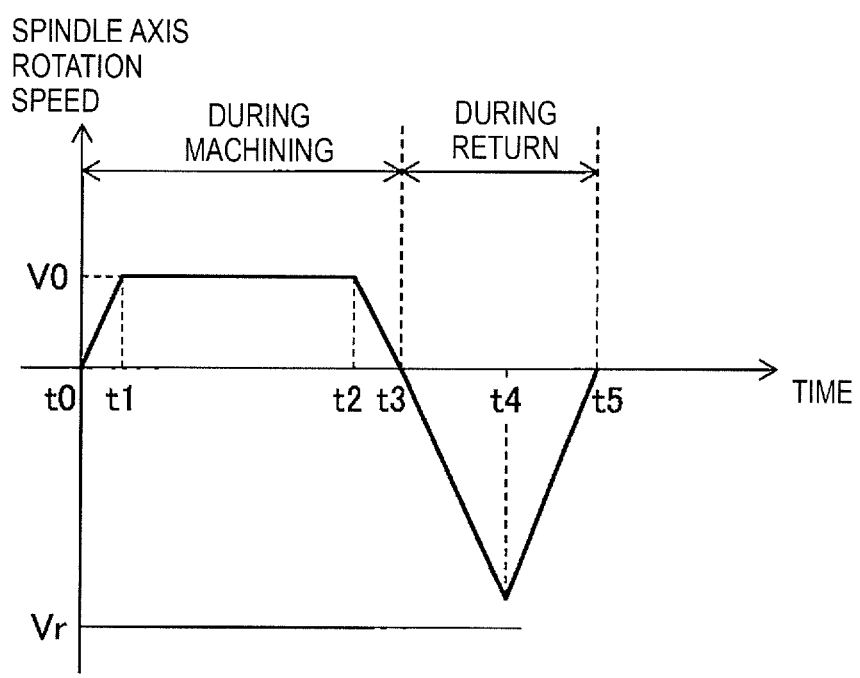
FIG. 3 is a graph showing an operation pattern in the tapping control operation according to the first embodiment.

FIG. 2 is a flowchart illustrating tapping control operation according to the first embodiment. The tapping control operation of FIG. 2 is performed under control of the control apparatus 10. When the tapping control operation starts, the numerical control unit 16 interprets the tapping program P to acquire maximum rotation speed during machining V0 and the total amount of rotation S0 and instructs the spindle axis control unit 18 about these values (step S1). The spindle axis control unit 18 having received the maximum rotation speed during machining V0 and the total amount of rotation S0 starts machining operation using the maximum rotation speed during machining V0 as a target speed (step S2). FIG. 3 shows an example of an operation pattern (a transition of spindle axis rotation speed) when the spindle axis control unit 18 performs spindle axis control according to the rotation speed V0 and the amount of rotation S0. In FIG. 3, the vertical axis represents spindle axis rotation speed, and the horizontal axis represents time. In operation during machining from time t0 to time t3, the spindle axis control unit 18 causes the spindle axis motor to accelerate at constant acceleration A0 while targeting the maximum rotation speed during machining V0. The maximum rotation speed during machining V0 is set to a relatively low value in consideration of a load and the like applied to a tool during cutting operation, so that it can be understood that typically the spindle axis rotation speed reaches the maximum rotation speed during machining V0 in a relatively short period after machining starts to form an operation pattern with a relatively long flat portion (a portion at a constant rotation speed) as shown in FIG. 3.

Upon the rotation speed reaching the rotation speed V0 at time t1, the spindle axis control unit 18 calculates, while maintaining the spindle axis 12 at the rotation speed V0, time t2 which results in the total amount of rotation S0 when the spindle axis 12 is decelerated at time t2 from the rotation speed V0 at deceleration (−A0) of which the absolute value is the same as that of the acceleration. In the operation pattern shown in FIG. 3, the area of a portion in a trapezoidal shape from time t0 to time t3 corresponds to the total amount of rotation S0. Thus, the spindle axis control unit 18 can determine time t2 for starting the deceleration such that the area of the portion in a trapezoidal shape from time t0 to time t3 in the operation pattern of FIG. 3 becomes equal to the total amount of rotation S0. The spindle axis control unit 18 causes the spindle axis 12 to decelerate, from time t2, at the deceleration (−A0) with the same absolute value as that of the acceleration to reach the target screw depth (total amount of rotation S0) at time t3.

The acceleration A0 during machining can be determined by various methods, such as a method of determination based on a speed-acceleration characteristic curve of the spindle axis motor, and a method of using a value input into the numerical control unit 16 from the tapping program or the like. In the first embodiment, any method may be used to designate the acceleration A0 during machining.

While the spindle axis control unit 18 controls the rotational operation of the spindle axis 12 from the machining start position to the target screw depth, the feed axis control unit 22 controls the feed axis 14 so as to follow the operation of the spindle axis 12 using the rotation position FBS of the spindle axis 12, thereby causing the feed axis 14 to perform feeding operation.

Upon operation during machining being completed in step S3, the numerical control unit 16 instructs the spindle axis control unit 18 about the maximum rotation speed during return Vr stored in the storage section 25 (step S4). The spindle axis control unit 18 having received the maximum rotation speed during return Vr from the numerical control unit 16 starts return operation of the spindle axis using the maximum rotation speed during return Vr as a target speed (step S5). In the operation pattern of FIG. 3, a portion from time t3 to time t5 shows the return operation. The spindle axis control unit 18 causes the spindle axis 12 to rotate inversely, for example, at the same acceleration as the acceleration A0 during machining, while targeting the maximum rotation speed during return Vr, and causes the spindle axis motor to decelerate at the deceleration (−A0) with the same absolute value as that of the acceleration at timing when the amount of rotation of the spindle axis 12 reaches half of the total amount of rotation S0 (time t4). This causes the spindle axis to return to the machining start position at time t5. When the spindle axis returns to the machining start position, the present machining control operation is finished (step S6). In the return operation exemplified in FIG. 3, the area of a triangular operation pattern from time t3 to time t5 corresponds to the total amount of rotation S0. Thus, the spindle axis control unit 18 can determine time t4 for starting the deceleration such that the area of the triangular portion from time t3 to time t5 in the operation pattern of FIG. 3 becomes equal to the total amount of rotation S0.

Operation at the time of return in FIG. 3 is performed to control acceleration while setting the maximum rotation speed during return Vr as a target speed, so that, as shown in FIG. 3, typically control can be performed according to the triangular operation pattern in which the control is turned to deceleration before the spindle axis rotation speed reaches the maximum rotation speed during return Vr and the total amount of rotation is reached. By thus achieving the control according to the triangular operation pattern as described above, operation at a constant speed (or a trapezoidal operation pattern) can be avoided. This enables the spindle axis 12 to return from a position of the target screw depth to an operation start position at constant acceleration in the fastest level. That is, this enables the return operation of drawing out a tool along a tapped trace machined to be increased in speed at the maximum to enable cycle time throughout tapping to be reduced.

While the spindle axis control unit 18 controls the rotational operation of the spindle axis 12 from the target screw depth to the machining start position, the feed axis control unit 22 controls the feed axis 14 so as to follow the operation of the spindle axis 12 using the rotation position FBS of the spindle axis 12, thereby causing the feed axis 14 to perform feeding operation.

Figure 4:
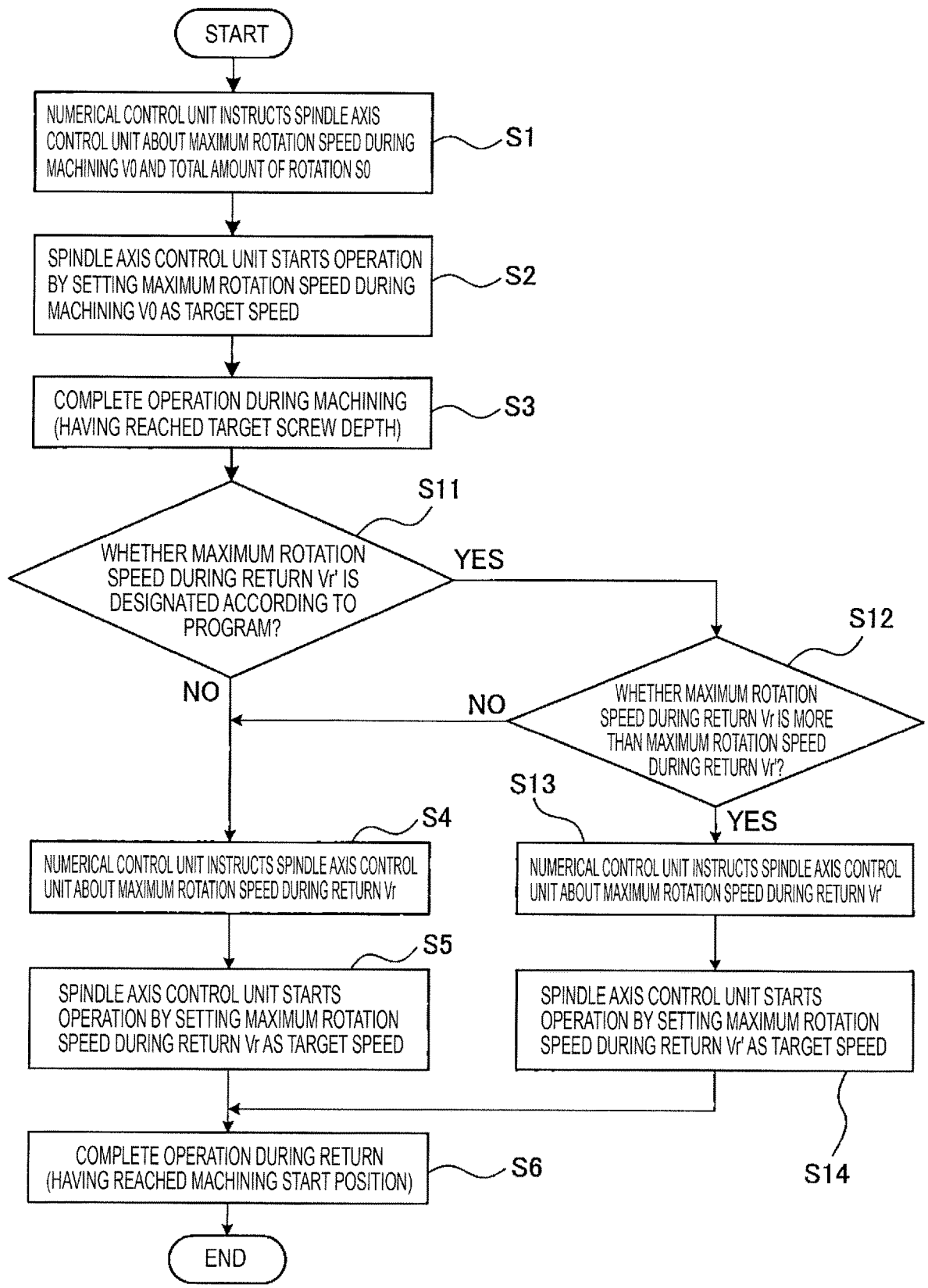
FIG. 4 is a flowchart illustrating tapping control operation configured so as to enable reflecting maximum rotation speed during return designated by a user in a tapping program.

In light of inertia and rigidity of a tool, a user may also designate relatively low maximum rotation speed during return of the spindle axis in the tapping program P. In such a case, the tapping control operation may be configured to enable reflecting the relatively low maximum rotation speed during return (hereinafter referred to as maximum rotation speed during return Vr') designated by a user in the tapping program P. FIG. 4 is a flowchart illustrating control enabling reflecting the maximum rotation speed during return Vr' designated by a user when the relatively low maximum rotation speed during return Vr' is designated by the user in the tapping program P, as a modification of the tapping control operation of FIG. 2. In the tapping control operation of FIG. 4, to the steps that are the same as those in the tapping control operation of FIG. 2, the same reference signs are assigned, and explanations thereof are omitted.

In the tapping control operation of FIG. 4, the same control as that in steps S1 to S3 in the tapping control operation of the first embodiment (FIG. 2) is performed as operation during machining. Upon the spindle axis 12 reaching the target screw depth to complete the operation during machining (step S3), the numerical control unit 16 determines whether the maximum rotation speed during return Vr' is designated by the tapping program P (step S11). When it is determined that the maximum rotation speed during return Vr' is designated by the tapping program P (S11: YES), the numerical control unit 16 determines whether the maximum rotation speed during return Vr stored in the storage section 25 is more than the maximum rotation speed during return Vr' designated by the tapping program P (step S12). When it is determined that the maximum rotation speed during return Vr' is not designated by the tapping program P (S11: NO), the numerical control unit 16 instructs the spindle axis control unit 18 about the maximum rotation speed during return Vr (step S4).

When it is determined that the maximum rotation speed during return Vr is more than the maximum rotation speed during return Vr' designated by the tapping program (S12: YES), it is regarded as that the tapping program P designates a speed lower than the allowable maximum rotation speed of the spindle axis motor with no-load as a return target speed. In this case, the numerical control unit 16 instructs the spindle axis control unit 18 about the maximum rotation speed during return Vr' designated by the tapping program P (step S13). The spindle axis control unit 18 having received the maximum rotation speed during return Vr' from the numerical control unit 16 controls the return operation using the maximum rotation speed during return Vr' as a target speed (step S14). The control of the return operation in step S14 corresponds to operation in which the speed Vr being a target speed in the return operation in step S5 of FIG. 2 is replaced with speed Vr', and the basic control scheme thereof is similar to that in the return operation in step S5.

Meanwhile, when the maximum rotation speed during return Vr is equal to or less than the maximum rotation speed during return Vr' designated by the tapping program (S12: NO), the numerical control unit 16 instructs the spindle axis control unit 18 about the maximum rotation speed during return Vr (step S4). The spindle axis control unit 18 having received the maximum rotation speed during return Vr controls the return operation using the maximum rotation speed during return Vr as a target speed (step S5). The operation control in this case is the same as that for the return operation in step S5 of FIG. 2. When the spindle axis 12 returns to the machining start position, the present tapping control operation is finished (step S6).

While the spindle axis control unit 18 controls the rotational operation during machining and return of the spindle axis 12, the feed axis control unit 22 controls the feed axis 14 so as to follow the operation of the spindle axis 12 using the rotation position FBS of the spindle axis 12, thereby causing the feed axis 14 to perform feeding operation.

The tapping control operation of FIG. 4 enables performing the return operation when relatively low maximum rotation speed during return Vr' is designated by a user while reflecting the speed Vr' and obtaining advantageous effect by the tapping control operation of FIG. 2 described above when the speed Vr' is not designated by a user.

Second Embodiment

Figure 5:
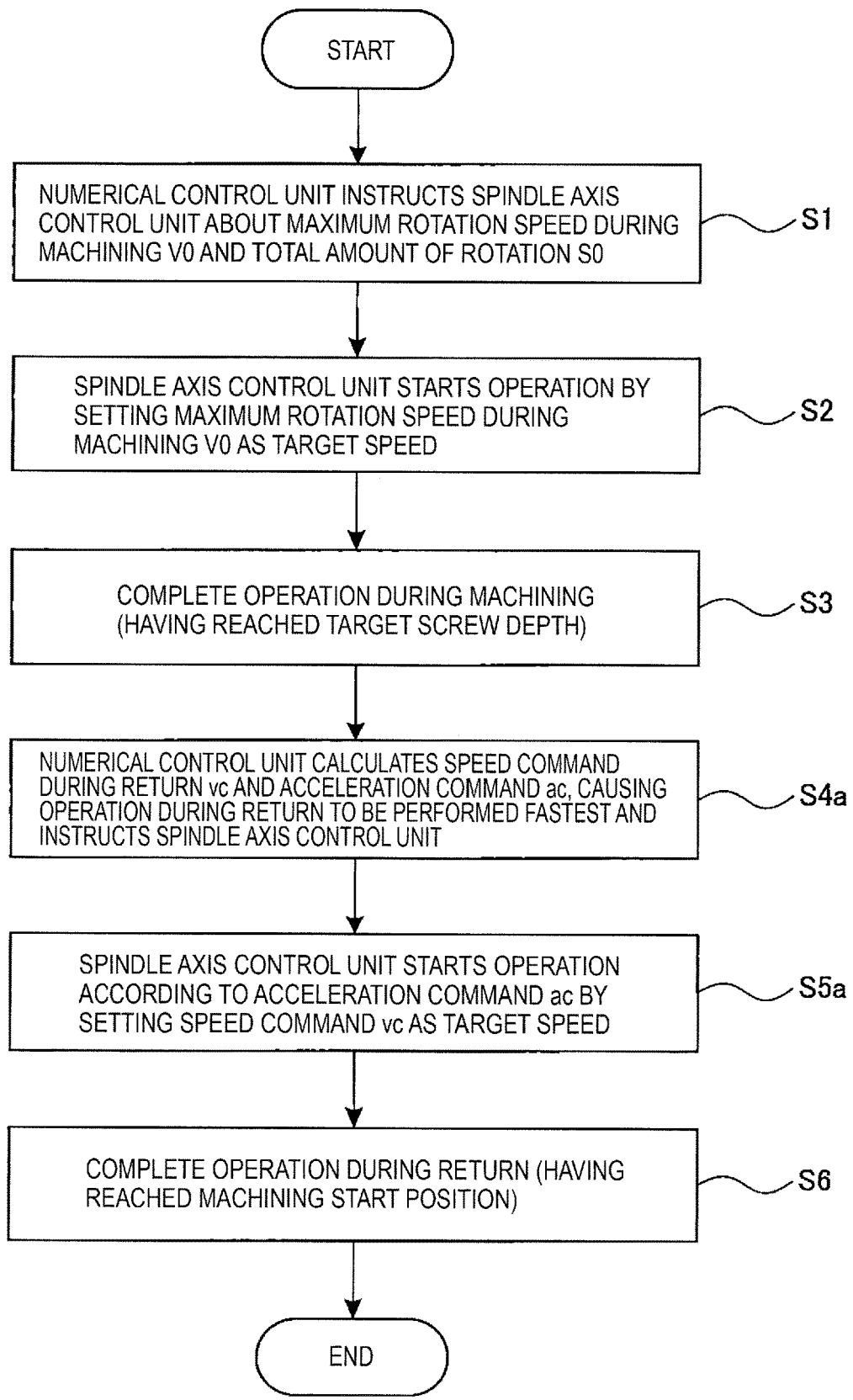
FIG. 5 is a flowchart illustrating tapping control operation according to a second embodiment.

FIG. 5 is a flowchart illustrating tapping control operation according to a second embodiment. The tapping control operation of FIG. 5 is performed by the control apparatus 10 having the hardware configuration illustrated in FIG. 1. In the tapping control operation of FIG. 5, to the steps that are the same as those in the tapping control operation of FIG. 2, the same reference signs are assigned, and explanations thereof are omitted.

In the tapping control operation of FIG. 5, the same control as that in steps S1 to S3 in the tapping control operation of the first embodiment (FIG. 2) is performed as operation during machining. Upon the spindle axis reaching a target screw depth to complete operation during machining (step S3), the numerical control unit 16 calculates return speed $v_c$ and acceleration $a_c$ as described below and instructs the spindle axis control unit 18 about the values $v_c$ and $a_c$ serving as a speed command and an acceleration command, respectively (step S4a). The return speed $v_c$ is determined so as to be equal to or less than the maximum rotation speed during return Vr.

Figure 6:
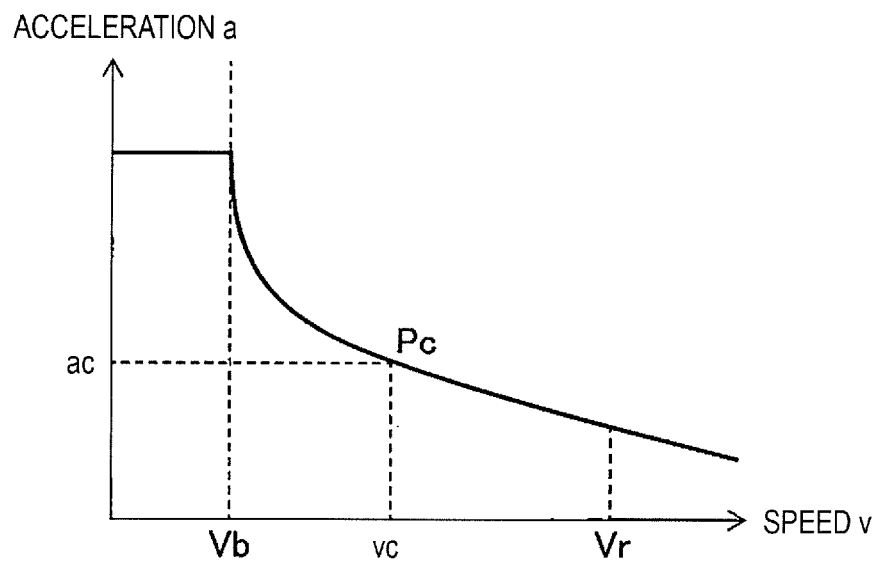
FIG. 6 is a graph showing a speed-acceleration characteristic curve of a spindle axis motor.
Figure 7:
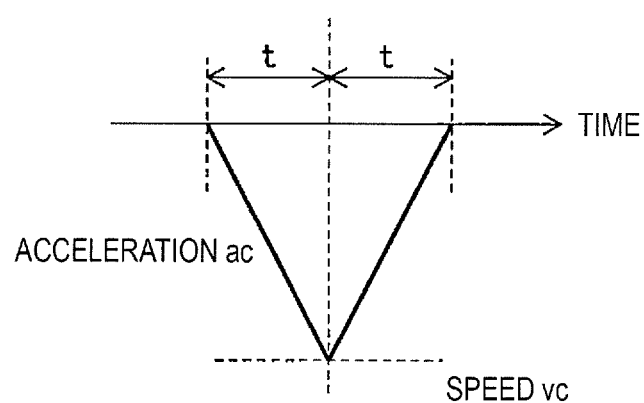
FIG. 7 is a graph showing an operation pattern in the tapping control operation according to the second embodiment.

FIG. 6 shows a speed-acceleration characteristic curve of a spindle axis motor. In FIG. 6, the horizontal and vertical axes represent spindle axis motor speed and acceleration, respectively. Data showing the speed-acceleration characteristic curve of FIG. 6 may be preliminarily stored in the storage section 25 of the numerical control unit 16 or may be input into the control apparatus 10 by a user. When return operation is controlled at constant acceleration, operation without a constant speed section (triangular operation pattern) as shown in FIG. 7 is the fastest operation. The maximum rotation speed in the operation pattern of FIG. 7 is defined as vc, and acceleration in the operation pattern of FIG. 7 is defined as ac. As a tapping operation condition, a total amount of rotation during return of the spindle axis 12, obtained by (a target screw depth)×(a screw pitch), is defined as $S_0$. In this case, the following relational expression holds in the fastest operation of FIG. 7. In the relational expression below, t is time for reaching speed vc from speed 0 (time for returning to speed 0 from speed vc), and $S_0$ is total amount of rotation of the spindle axis.

$$(\tfrac{1}{2})a_c t^2 = S_0/2 \tag{1}$$

$$a_c t = v_c \tag{2}$$

From the above mathematical expressions (1) and (2), a relationship among ac, vc, and $S_0$ is as follows:

$$v_c^2 / a_c = S_0 \tag{3}$$

The numerical control unit 16 determines speed vc and acceleration ac, satisfying the above mathematical expression (3), from the speed-acceleration characteristic curve of FIG. 6, subject to satisfying vc≤Vr. For example, point Pc on the speed-acceleration characteristic curve of FIG. 6 is determined as the speed vc and the acceleration ac, satisfying the above mathematical expression (3).

The above control enables achieving the fastest return operation at constant acceleration by setting the maximum rotation speed during return Vr as a target speed (step S5a). This also enables cycle time throughout tapping to be reduced at the maximum.

While the spindle axis control unit 18 controls the rotational operation during machining and return of the spindle axis 12, the feed axis control unit 22 controls the feed axis 14 so as to follow the operation of the spindle axis 12 using the rotation position FBS of the spindle axis 12, thereby causing the feed axis 14 to perform feeding operation.

Third Embodiment

Figure 8:
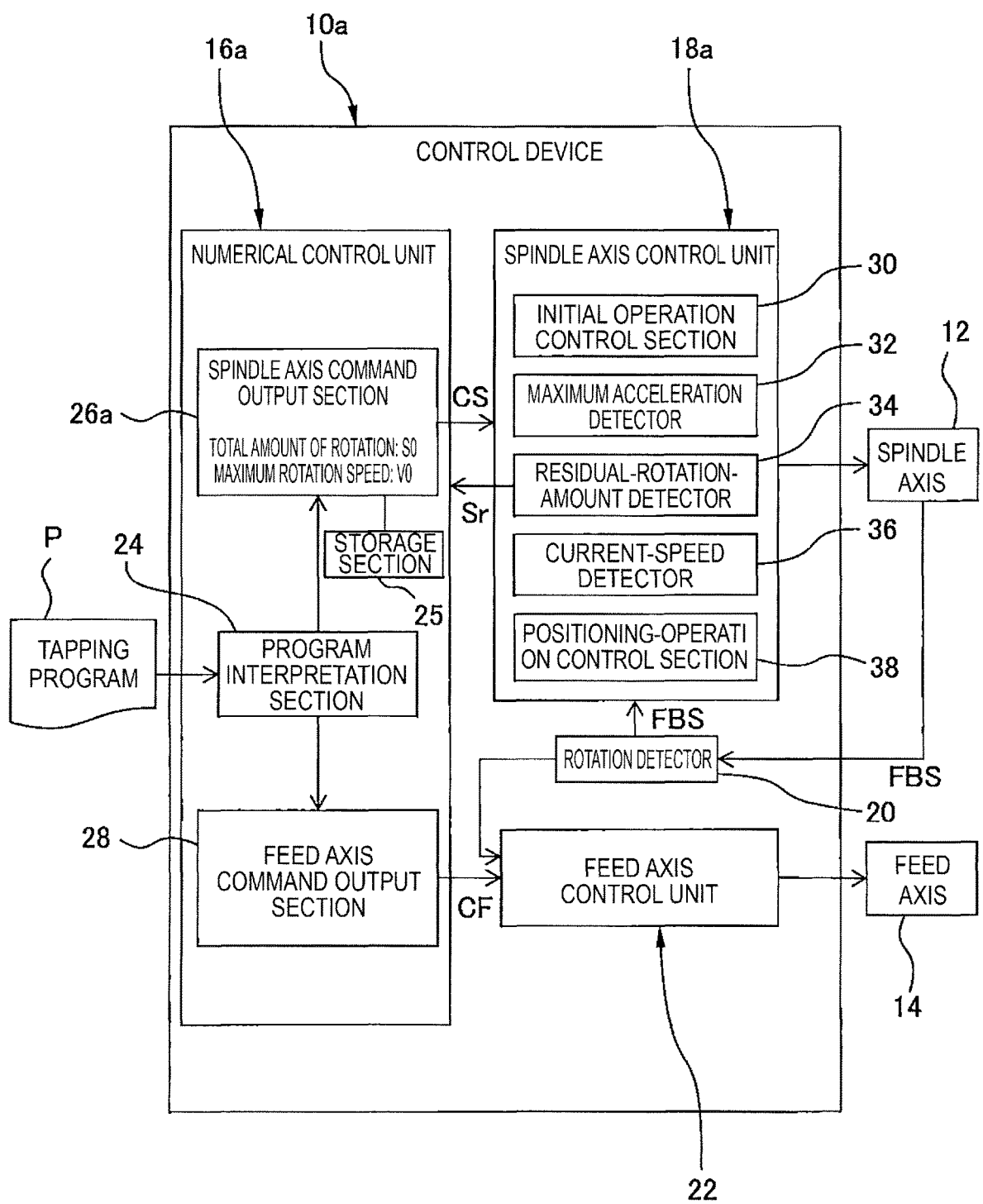
FIG. 8 is a function block diagram illustrating a configuration of a control apparatus of a machine tool, according to a third embodiment.

FIG. 8 is a function block diagram illustrating a configuration of a control apparatus 10a according to a third embodiment. In FIG. 8, to the components that are the same as those of the control apparatus according to the first embodiment of FIG. 1, the same reference signs are assigned, and explanations thereof are omitted.

In the present embodiment, prior to the start of tapping, a spindle axis command output section 26a acquires the total amount of rotation S0 and the maximum rotation speed V0 of the spindle axis 12 during a period from a machining start position (rotation position) to a target screw depth (rotation position), from a command value of the tapping program P interpreted by the program interpretation section 24, and transmits the total amount of rotation S0 and maximum rotation speed V0 to a spindle axis control unit 18a as the spindle axis command CS. For example, as with the first embodiment, when the tapping program P includes a command of machining a female screw with a screw pitch of 1.25 mm and a screw depth of 30 mm at the maximum rotation speed V0 of 3000/min of the spindle axis 12, the spindle axis command output section 26a notifies the spindle axis control unit 18a of the following: V0=3000 (min$^{-1}$), and S0=24 (rev).

The spindle axis control unit 18a controls the rotational operation of the spindle axis 12 with typical feedback control using the rotation position FBS of the spindle axis 12 detected by the rotation detector 20. The feed axis control unit 22 controls the feeding operation of the feed axis 14, following the operation of the spindle axis 12, with feedback control using not only a feedback value of a feed position of the feed axis 14, but also the rotation position FBS of the spindle axis 12.

The spindle axis control unit 18a includes: an initial operation control section 30 for accelerating and rotating the spindle axis 12 at maximum capacity from the machining start position toward the target screw depth by setting maximum rotation speed V0 (min$^{-1}$) transmitted from the spindle axis command output section 26a as a target value; a maximum acceleration detector 32 for detecting maximum acceleration A0 (min$^{-1}$/s) on the basis of the rotation position FBS during accelerated rotation at the maximum capacity; a residual-rotation-amount detector 34 for detecting a residual amount of rotation Sr (rev) of the spindle axis 12 from a current position (rotation position) to the target screw depth on the basis of the total amount of rotation S0 (rev) transmitted from the spindle axis command output section 26a and the rotation position FBS; a current-speed detector 36 for detecting current speed Vc (min$^{-1}$) of the spindle axis 12 on the basis of the rotation position FBS; and a positioning-operation control section 38 for decelerating and rotating the spindle axis 12 at maximum capacity on the basis of the maximum acceleration A0, the residual amount of rotation Sr, and the current speed Vc, after the accelerated rotation at the maximum capacity, to cause the spindle axis 12 to reach the target screw depth. In the present embodiment, the positioning-operation control section 38 may be configured to decelerate and rotate the spindle axis 12 at the maximum capacity, and to stop the spindle axis 12 at the target screw depth.

Figure 9:
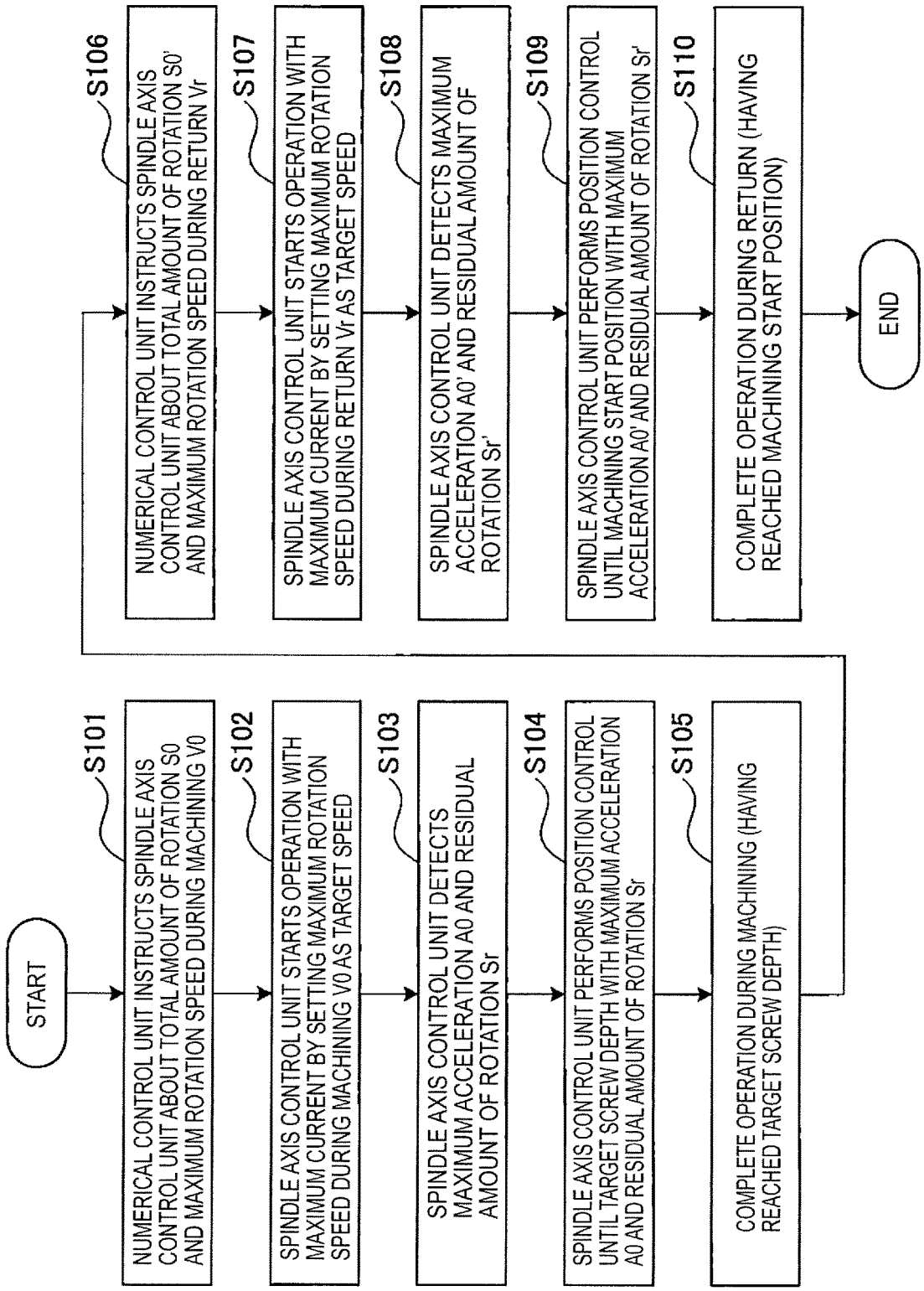
FIG. 9 is a flowchart illustrating tapping control operation according to the third embodiment.

FIG. 9 is a flowchart illustrating tapping control operation according to the third embodiment. The tapping control operation of FIG. 9 is performed by the control apparatus 10a having the hardware configuration illustrated in FIG. 8.

In step S101, the numerical control unit 16a instructs the spindle axis control unit 18a about the total amount of rotation S0 and maximum rotation speed during machining V0 of the spindle axis 12. In step S102, the spindle axis control unit 18a (the initial operation control section 30, the maximum acceleration detector 32, and the residual-rotation-amount detector 34) causes the spindle axis 12 to accelerate and rotate at maximum capacity using allowable electric current of a driving source (spindle axis motor) at the maximum from the machining start position, by setting the maximum rotation speed during machining V0 as a target speed, thereby performing tapping. During that time, the spindle axis control unit 18a detects the maximum acceleration A0, and sequentially detects the residual amount of rotation Sr from a current position (step S103). Each time the residual amount of rotation Sr is detected, the spindle axis control unit 18a notifies the numerical control unit 16a of the detected residual amount of rotation Sr.

In step S104, the spindle axis control unit 18a performs position control to the target screw depth using the maximum acceleration A0 and the residual amount of rotation Sr. Hereinafter, an operation example of typical position control will be described. The spindle axis control unit 18a (the current-speed detector 36) sequentially detects the current speed Vc during accelerated rotation at the maximum capacity, and each time the current speed Vc is detected, the spindle axis control unit 18a determines whether the current speed Vc reaches maximum rotation speed V0. When it is determined that the speed Vc does not reach the speed V0, the spindle axis control unit 18a determines whether the residual amount of rotation Sr is half or less of the total amount of rotation S0. When it is determined that that the residual amount of rotation Sr becomes half or less of the total amount of rotation S0 before the speed Vc reaches the maximum rotation speed V0, the spindle axis control unit 18a causes the spindle axis 12 to decelerate and rotate at the maximum capacity using the allowable electric current of the driving source at the maximum, thereby continuously performing tapping.

Figure 10:
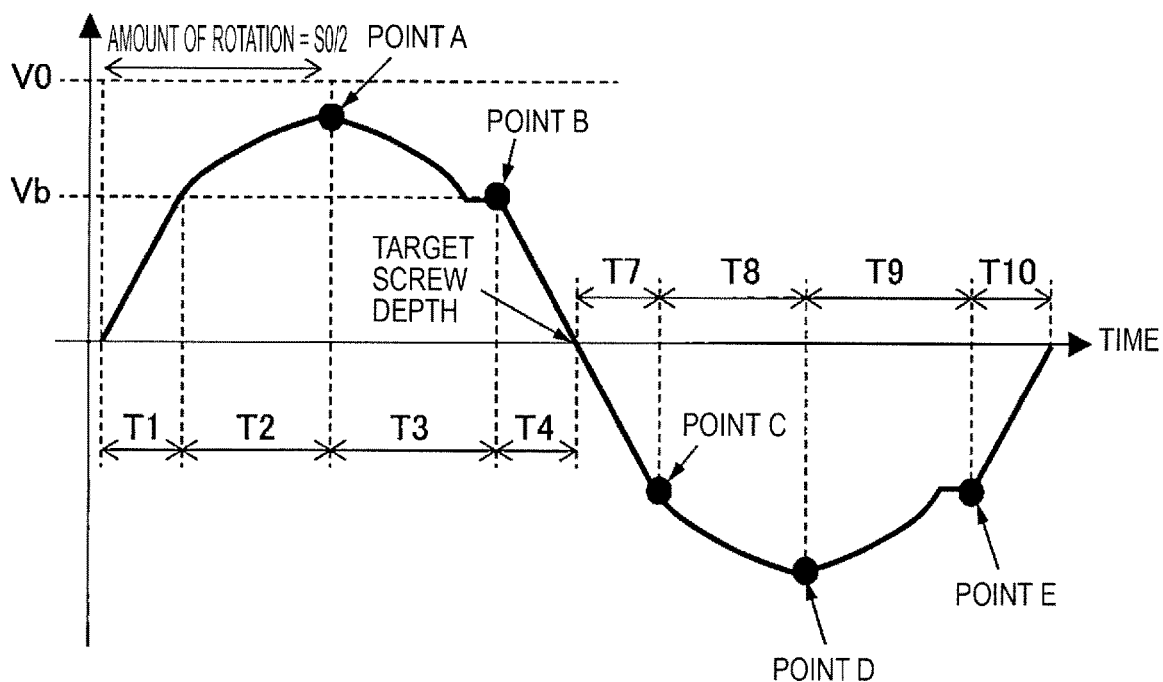
FIG. 10 is a graph showing an operation pattern in the tapping control operation according to the third embodiment.

With reference to FIG. 10, the operation of the spindle axis 12 when the residual amount of rotation Sr becomes half of the total amount of rotation S0 before the current speed Vc reaches the maximum rotation speed V0 is shown with a speed-time curve, as a typical operation example. In FIG. 10, speed Vb is preliminarily set for the spindle axis 12 as rotation speed (e.g., the base speed of a servo motor) at which acceleration at constant torque (or constant acceleration) can be performed until the speed Vb is reached from the start, and can be stored in the storage section 25 of the control apparatus 10a as one of control parameters, for example.

The spindle axis 12 is accelerated and rotated at maximum capacity in step S102 during time T1 and time T2 of FIG. 10, and the maximum acceleration A0 is detected during the constant acceleration operation in time T1. When rotation speed of the spindle axis 12 exceeds the speed Vb, the acceleration of the spindle axis 12 gradually decreases from the maximum acceleration A0 due to characteristics of the servo motor (refer to FIG. 6). At point A at which the residual amount of rotation Sr becomes half of the total amount of rotation S0 (or the amount of rotation from a start of machining becomes half of the total amount of rotation S0), the operation of the spindle axis 12 is changed from accelerated rotation to decelerated rotation, and then the decelerated rotation is performed at the maximum capacity of the spindle axis 12 during time T3. While the spindle axis 12 is decelerated and rotated from point A by setting the speed Vb as a target value during time T3, the deceleration of the spindle axis 12 gradually increases during this time due to the characteristics of the servo motor, for example. Even during decelerated rotation at the maximum capacity, the spindle axis control unit 18a (the residual-rotation-amount detector 34 and the current-speed detector 36) sequentially detects the residual amount of rotation Sr from the current position of the spindle axis 12 and the current speed Vc.

Subsequently, the spindle axis control unit 18a (the positioning-operation control section 38) monitors the residual amount of rotation Sr (rev) and the current speed Vc (min$^{-1}$) that are sequentially detected, and acquires point B (FIG. 10) which is expected to result in the residual amount of rotation Sr=0 (or reaching the target screw depth) when the spindle axis 12 is decelerated at point B from the current speed Vc (min$^{-1}$) at maximum deceleration A0 (negative value) corresponding to the maximum acceleration A0 (min$^{-1}$/s), as an absolute value of the residual amount of rotation Sr (negative value) viewed from a point Sr=0, according to the following expression.

$$|Sr|=Vc^2/|A0|/120$$

according to a formula:

$$(Vc/60)^2=2\times|A0|/60\times|Sr|$$

The present embodiment is based on the premise that the spindle axis 12 is decelerated at the constant maximum deceleration A0 from point B. Thus, the current speed Vc of the spindle axis 12 reaches the speed Vb at point B. That is, the position |Sr| of point B can be acquired as follows: $|Sr|=Vb^2/|A0|/120$.

In the present embodiment, torque required for the acceleration of the spindle axis 12 (hereinafter referred to as acceleration torque) and torque required for deceleration thereof (hereinafter referred to as deceleration torque) are equal to each other. In general, a load (resistance) is generated due to machine structure during rotation of the spindle axis 12, therefore acceleration torque becomes greater than deceleration torque. Thus, when acceleration torque is equal to deceleration torque, acceleration time at maximum capacity is longer than deceleration time at maximum capacity when compared in regard to the same speed change. Thus, the spindle axis 12 actually reaches the speed Vb in time shorter than time T2 after being decelerated from point A. At this time, position |Sr| is expressed as follows: $|Sr|>Vc^2/|A0|/120$. Then, the spindle axis 12 rotates at constant speed Vb for a fraction of time to reach point B expressed as follows: $|Sr|=Vb^2/|A0|/120$ (FIG. 10).

With reference to FIG. 10 again, the spindle axis control unit 18a (the positioning-operation control section 38) determines whether absolute value |Sr| of the residual amount of rotation at a current position of the spindle axis 12 satisfies the following: $|Sr|=Vb^2/|A0|/120$ (or whether a rotation position of the spindle axis 12 reaches point B) in step S104. When it is determined that the equality, $|Sr|=Vb^2/|A0|/120$, is satisfied, the spindle axis control unit 18a (the positioning-operation control section 38) creates a command (a command for stopping the spindle axis 12 at a target screw depth in an embodiment) for causing the spindle axis 12 to reach a point where Sr is zero (or the target screw depth) by decelerating and rotating the spindle axis 12 at the maximum deceleration A0. Then, the spindle axis control unit 18a controls a position of the spindle axis 12 according to the command. When it is determined that the equality, $|Sr|=Vb^2/|A0|/120$, is not satisfied, determination is repeated until the equality is satisfied. The spindle axis 12 performs tapping by decelerating and rotating at the maximum deceleration A0 from point B toward the target screw depth according to the command from the spindle axis control unit 18a (the positioning-operation control section 38), and then reaches target screw depth at time when Sr becomes zero (stops at the target screw depth in an embodiment)(step S105). As described above, the spindle axis control unit 18 controls a position of the spindle axis 12 during time T4 in which the spindle axis 12 reaches the target screw depth from point B.

While the spindle axis control unit 18a controls the rotational operation of the spindle axis 12 from the machining start position to the target screw depth, the feed axis control unit 22 controls the feed axis 14 so as to follow the operation of the spindle axis 12 using the rotation position FBS of the spindle axis 12, thereby causing the feed axis 14 to perform feeding operation. While the spindle axis control unit 18a controls rotational operation from the machining start position to the target screw depth, the numerical control unit 16a monitors the residual amount of rotation Sr notified by the spindle axis control unit 18a, and then may determine that tapping reaches the target screw depth when the residual amount of rotation Sr becomes a first predetermined value (a fraction of value close to zero) or less.

After the tapping reaches the target screw depth, the return operation is performed in steps S106 to S110. In step 106, the numerical control unit 16a acquires a total amount of rotation S0' of the spindle axis 12 during a period from the target screw depth to a return-complete position at which the return of the spindle axis 12 is completed, from a command value of the tapping program P interpreted by the program interpretation section 24. Then, the numerical control unit 16a transmits the total amount of rotation S0' and the maximum rotation speed during return Vr stored in the storage section 25 to the spindle axis control unit 18a as the spindle axis command CS. The return-complete position may be identical to the machining start position, or different from the machining start position. When the return-complete position is identical to the machining start position, the total amount of rotation S0' is equal to the total amount of rotation S0 for cutting.

In step S107, the spindle axis control unit 18a (the initial operation control section 30, the maximum acceleration detector 32, and the residual-rotation-amount detector 34) performs control as described below. The initial operation control section 30 causes the spindle axis 12 to accelerate and rotate inversely at maximum capacity using the allowable electric current of the driving source at the maximum from the target screw depth toward the return-complete position, by setting the maximum rotation speed during return Vr as a target speed, thereby performing the return operation. The maximum acceleration detector 32 detects maximum acceleration A0' for inverse rotation on the basis of the rotation position FBS during accelerated inverse rotation at the maximum capacity. The residual-rotation-amount detector 34 sequentially detects a residual amount of return rotation Sr' of the spindle axis 12 from a current position to the return-complete position on the basis of a total amount of return rotation S0' and the rotation position FBS (step S108). Each time the residual amount of return rotation Sr' is detected, the spindle axis control unit 18a notifies the numerical control unit 16a of the detected residual amount of return rotation Sr'.

In step S109, the spindle axis control unit 18a performs position control to the machining start position using the maximum acceleration A0 and the residual amount of rotation Sr. As an example of typical operation, position control as described below is performed. The spindle axis control unit 18a (the current-speed detector 36) sequentially detects current speed Vc' of inverse rotation during accelerated inverse rotation at the maximum capacity on the basis of the rotation position FBS, and each time the current speed Vc' is detected, the spindle axis control unit 18a determines whether the current speed Vc' reaches the maximum rotation speed during return Vr. When it is determined that the speed Vc' does not reach the speed Vr, the spindle axis control unit 18a determines whether the residual amount of return rotation Sr' is half or less of the total amount of return rotation S0'. When it is determined that the residual amount of return rotation Sr' becomes half or less of the total amount of return rotation S0' before the current speed Vc' reaches the maximum rotation speed during return Vr, the spindle axis control unit 18a causes the spindle axis 12 to decelerate and rotate inversely at the maximum capacity using the allowable electric current of the driving source at the maximum, thereby continuously performing the return operation.

In step S109, the spindle axis control unit 18a (the positioning-operation control section 38) determines whether an absolute value |Sr'| of the residual amount of return rotation Sr' at a current position of the spindle axis 12 satisfies the following: $|Sr'|=Vb^2/|A0'|/120$. When the equality, $|Sr'|=Vb^2/|A0'|/120$, is satisfied, the spindle axis control unit 18a (the positioning-operation control section 38) creates a command for stopping the spindle axis 12 at a point where Sr' is zero (or the return-complete position) by decelerating and rotating inversely the spindle axis 12 at maximum deceleration A0'. Then, the spindle axis control unit 18a controls a position of the spindle axis 12 according to the command. When the equality, $|Sr'|=Vb^2/|A0'|/120$, is not satisfied, determination is repeated until the equality is satisfied. The spindle axis 12 performs the return operation by decelerating and rotating inversely at the maximum deceleration A0' toward the return-complete position according to the command from the spindle axis control unit 18a (the positioning-operation control section 38), and then stops at time when Sr' becomes zero (step S110).

While the spindle axis control unit 18a controls inverse rotational operation of the spindle axis 12 from the target screw depth to the return-complete position, the feed axis control unit 22 controls the feed axis 14 so as to follow the operation of the spindle axis 12 using the rotation position FBS of the spindle axis 12, thereby causing the feed axis 14 to perform inverse feeding operation. While the spindle axis control unit 18a controls the inverse rotational operation from the target screw depth to the return-complete position, the numerical control unit 16a monitors the residual amount of return rotation Sr' notified by the spindle axis control unit 18a, and then may determine that the return operation is completed and a tool is drawn out from a workpiece, when the residual amount of return rotation Sr' becomes a second predetermined value (a fraction of value close to zero) or less.

The above return operation of the spindle axis 12 can be expressed with a speed-time curve as with the machining operation shown in FIG. 10. As shown in FIG. 10, the current speed Vc of the spindle axis 12 becomes zero at the moment when the spindle axis 12 reaches the target screw depth. Then, the spindle axis 12 performs the return operation from the target screw depth toward point C throughout time T7, by generating acceleration A0 for inverse rotation while maintaining the maximum deceleration A0 and thereby causing accelerated inverse rotation that gradually increases the current speed Vc (negative value), according to the command from the spindle axis control unit 18 (the positioning-operation control section 38).

A position of the spindle axis 12 at point C can be arbitrarily set. For example, point C can be set at the position same as that of point B where decelerated rotation at the maximum deceleration A0 starts during cutting operation as shown in FIG. 10. Point C in this case is at a position where the spindle axis 12 inversely rotates from the target screw depth by the amount of rotation corresponding to a value acquired by the equality, $|Sr|=Vb^2/|A0|/120$. According to this configuration, cutting operation of the spindle axis 12 (time T1 to time T4) from a start of machining until the spindle axis 12 reaches the target screw depth via point B, and the return operation of the spindle axis 12 (time T7 to time T10) from the target screw depth until the spindle axis 12 reaches the return-complete position via point C, can be expressed with substantially identical speed-time curves excepting that speeds thereof have mutually reverse signs, as shown in FIG. 10. That is, the spindle axis 12 accelerates and inversely rotates at constant acceleration A0 during time T7 as with accelerated rotation at the constant maximum acceleration A0 during time T1.

In the example shown in FIG. 10, after the spindle axis 12 reaches a predetermined rotation position (point C), the current speed of the spindle axis 12 inversely rotating exceeds speed Vb (negative value). As a result, the acceleration of the inverse rotation of the spindle axis 12 gradually decreases from A0 in accelerated inverse rotation at maximum capacity, due to characteristics of a servo motor, for example (time T8). At point D at which the residual amount of return rotation Sr' becomes half of the total amount of return rotation amount S0' (or the amount of rotation from the target screw depth becomes half of the total amount of rotation S0'), the operation of the spindle axis 12 is changed from accelerated inverse rotation to decelerated inverse rotation, and then the decelerated inverse rotation is performed at the maximum capacity of the spindle axis 12 during time T9.

Subsequently, the spindle axis control unit 18a (the positioning-operation control section 38) determines whether absolute value |Sr'| of the residual amount of return rotation Sr' at a current position of the spindle axis 12 satisfies the following: $|Sr'|=Vb2/|A0'|/120$ (or whether a rotation position of the spindle axis 12 reaches point E (FIG. 10)). When the equality, $|Sr'|=Vb^2/|A0'|/120$, is satisfied, the spindle axis control unit 18a (positioning-operation control section 38) creates a command for stopping the spindle axis 12 at a point where Sr' is zero (or the return-complete position) by decelerating and rotating inversely the spindle axis 12 at the maximum deceleration A0' (a value corresponding to the acceleration A0 of inverse rotation during time T7). Then, the spindle axis control unit 18a controls a position of the spindle axis 12 according to the command. The spindle axis 12 performs the return operation by decelerating and rotating inversely at the maximum deceleration A0' toward the return-complete position according to the command from the spindle axis control unit 18a (the positioning-operation control section 38), and then stops at time when Sr' becomes zero.

According to the above embodiment, the spindle axis 12 can be controlled in the return operation by setting the maximum rotation speed during return Vr that is the allowable maximum rotation speed of the spindle axis motor with no-load as a target speed. This enables the return operation of the spindle axis to be performed with the fastest operation. This also enables cycle time throughout tapping to be reduced at the maximum.

While the invention has been described with reference to specific embodiments, it will be understood, by those skilled in the art, that various changes or modifications may be made thereto without departing from the scope of the following claims.

While the allowable maximum rotation speed of the spindle axis motor with no-load is used as the maximum rotation speed during return Vr in the above embodiment, using, as the maximum rotation speed during return Vr, a value of speed that does not depend on the maximum rotation speed during machining of the spindle axis and that is higher than the maximum rotation speed during machining enables the return operation to be increased in speed.

To solve the problem of the present disclosure, various aspects as described below and effects thereof can be provided. In description of the aspects below, a number in parentheses corresponds to that of the reference sign in the drawings of the present disclosure.

For example, a first aspect of the present disclosure is a control apparatus (10) configured to control synchronized operation of a spindle axis (12) and a feed axis (14) of a machine tool, and that includes a numerical control unit (16) configured to create a spindle axis command and a feed axis command according to a tapping program (P), a spindle axis control unit (18) configured to control the rotational operation of the spindle axis (12) according to the spindle axis command, a rotation detector (20) configured to detect a rotation position of the spindle axis (12), and a feed axis control unit (22) configured to control the feeding operation of the feed axis (14) according to the feed axis command on a basis of the rotation position. The numerical control unit (16) is further configured to include, in the spindle axis command, a speed command value during return that does not depend on maximum rotation speed during machining of the spindle axis (12) and that is higher than the maximum rotation speed during machining, as a command of return operation for returning to a machining start position from a target screw depth.

The first aspect enables the return operation of the spindle axis to be performed at high speed without depending on the maximum rotation speed during machining of the spindle axis.

A second aspect of the present disclosure is the control apparatus (10) of the first aspect above that further includes a storage section (25) storing an allowable maximum rotation speed of a driving source with no-load for driving the spindle axis, wherein the numerical control unit is further configured to include, in the spindle axis command, the allowable maximum rotation speed of the driving source with no-load stored in the storage section (25) as the speed command value during return.

A third aspect of the present disclosure is the control apparatus (10) of the second aspect above, wherein the numerical control unit (16) is further configured to determine whether a maximum rotation speed during return of the spindle axis (12) is designated by the tapping program (P), and when the maximum rotation speed during return of the spindle axis (12) is designated according to the tapping program (P) and the maximum rotation speed during return designated by the tapping program (P) is less than the allowable maximum rotation speed of the driving source with no-load, the numerical control unit (16) is further configured to include, in the spindle axis command, the maximum rotation speed during return designated by the tapping program (P) as the speed command value during return.

A fourth aspect of the present disclosure is the control apparatus (10) of the first aspect above, wherein the numerical control unit (16) is further configured to acquire return speed and return acceleration of the spindle axis that causes the return operation to be performed fastest at constant acceleration, from tapping operation conditions and speed-acceleration characteristics of a driving source for driving the spindle axis, and include, in the spindle axis command, the return speed, as the speed command value during return, and include, in the spindle axis command, the return acceleration.

A fifth aspect of the present disclosure is the control apparatus (10a) of the second aspect above, wherein the numerical control unit (16a) is further configured to acquire a total amount of rotation of the spindle axis (12) during a period from the machining start position to the target screw depth and maximum rotation speed during machining, from the tapping program (P), and transmit the total amount of rotation and the maximum rotation speed during machining to the spindle axis control unit (18a), as the spindle axis command during machining operation, and the spindle axis control unit (18a) includes: an initial operation control section (30) configured to cause the spindle axis (12) to accelerate and rotate at maximum capacity of the driving source, using allowable electric current at a maximum, from the machining start position toward the target screw depth by setting the maximum rotation speed during machining as a target speed; a maximum acceleration detector (32) configured to detect maximum acceleration on a basis of the rotation position during accelerated rotation at the maximum capacity; a residual-rotation-amount detector (34) configured to detect the residual amount of rotation of the spindle axis from a current position to the target screw depth on a basis of the total amount of rotation and the rotation position; a current-speed detector (36) configured to detect current speed of the spindle axis (12) on a basis of the rotation position; and a positioning-operation control section (38) configured to cause the spindle axis (12) to reach the target screw depth by decelerating and rotating the spindle axis (12) at maximum capacity on a basis of the maximum acceleration, the residual amount of rotation, and the current speed, after accelerated rotation at the maximum capacity, wherein in the return operation, the initial operation control section (30) is further configured to cause the spindle axis (12) to accelerate and rotate inversely at the maximum capacity of the driving source using allowable electric current at a maximum from the target screw depth toward the machining start position by setting the allowable maximum rotation speed of the driving source with no-load as a target speed, the maximum acceleration detector (32) is further configured to detect the maximum acceleration on a basis of the rotation position during accelerated inverse rotation at the maximum capacity, the residual-rotation-amount detector (34) is further configured to detect the residual amount of rotation the spindle axis (12) from a current position until the spindle axis (12) returns to the machining start position on a basis of the total amount of rotation and the rotation position, and the positioning-operation control section (38) is further configured to cause the spindle axis (12) to decelerate and rotate inversely at the maximum capacity on a basis of the maximum acceleration, the residual amount of rotation, and the current speed, after accelerated inverse rotation at the maximum capacity, thereby causing the spindle axis (12) to reach the machining start position.

The invention claimed is:

1. A control apparatus configured to control synchronized operation of a spindle axis and a feed axis of a machine tool, the control apparatus comprising:
   a rotation detector configured to detect a rotation position of the spindle axis; and
   at least one processor configured to:
      to create a spindle axis command and a feed axis command according to a tapping program;
      control rotational operation of the spindle axis according to the spindle axis command;
      control feeding operation of the feed axis according to the feed axis command on a basis of the rotation position,
      wherein the at least one processor includes, in the spindle axis command, a speed command value during return that does not depend on maximum rotation speed during machining of the spindle axis and that is higher than the maximum rotation speed during machining, as a command of return operation for returning to a machining start position from a target screw depth, and
   wherein the at least one processor is further configured to:
      determine whether the tapping program specifies a designated maximum rotation speed during return of the spindle axis, and
      when the tapping program does not specify the designated maximum rotation speed during return of the spindle axis, control the spindle to rotate at a predetermined maximum rotation speed during return of the spindle axis,
      when the tapping program specifies the designated maximum rotation speed during return of the spindle axis:
         control the spindle to rotate at the designated maximum rotation speed during return of the spindle axis when the predetermined maximum rotation speed is greater than the designated maximum rotation speed, and
         control the spindle to rotate at the predetermined maximum rotation speed during return of the spindle axis when the predetermined maximum rotation speed is not greater than the designated maximum rotation speed.

2. The control apparatus according to claim 1, further comprising a memory device storing an allowable maximum rotation speed of a driving source with no-load for driving the spindle axis,
   wherein the at least one processor is further configured to include, in the spindle axis command, the allowable maximum rotation speed of the driving source with no-load stored in the storage section as the speed command value during return.

3. The control apparatus according to claim 1, wherein the at least one processor is further configured to:

acquire return speed and return acceleration of the spindle axis that causes the return operation to be performed fastest at constant acceleration, from tapping operation conditions and speed-acceleration characteristics of a driving source for driving the spindle axis; and include, in the spindle axis command, the return speed, as the speed command value during return, and include, in the spindle axis command further, the return acceleration.

4. The control apparatus according to claim 2, wherein the at least one processor is further configured to:
acquire a total amount of rotation of the spindle axis during a period from the machining start position to the target screw depth and maximum rotation speed during machining, from the tapping program,
include the total amount of rotation and the maximum rotation speed during machining in the spindle axis command during machining operation, and
cause the spindle axis to accelerate and rotate at maximum capacity of the driving source, using allowable electric current at a maximum, from the machining start position toward the target screw depth by setting the maximum rotation speed during machining as a target speed;

the control apparatus further comprises:
a maximum acceleration detector configured to detect maximum acceleration on a basis of the rotation position during accelerated rotation at the maximum capacity;
a residual-rotation-amount detector configured to detect a residual amount of rotation of the spindle axis from a current position to the target screw depth on a basis of the total amount of rotation and the rotation position; and
a current-speed detector configured to detect current speed of the spindle axis on a basis of the rotation position; and the at least one processor is further configured to:
cause the spindle axis to reach the target screw depth by decelerating and rotating the spindle axis at maximum capacity on a basis of the maximum acceleration, the residual amount of rotation, and the current speed, after accelerated rotation at the maximum capacity, and
in the return operation, cause the spindle axis to accelerate and rotate inversely at the maximum capacity of the driving source using allowable electric current at a maximum from the target screw depth toward the machining start position by setting the allowable maximum rotation speed of the driving source with no-load as a target speed, wherein the maximum acceleration detector is further configured to detect the maximum acceleration on a basis of the rotation position during accelerated inverse rotation at the maximum capacity, wherein the residual-rotation-amount detector is further configured to detect the residual amount of rotation of the spindle axis from a current position until the spindle axis returns to the machining start position on a basis of the total amount of rotation and the rotation position, and wherein the at least one processor is further configured to cause the spindle axis to decelerate and rotate inversely at the maximum capacity on a basis of the maximum acceleration, the residual amount of rotation, and the current speed, after accelerated inverse rotation at the maximum capacity, thereby causing the spindle axis to reach the machining start position.

* * * * *